Figure 1:
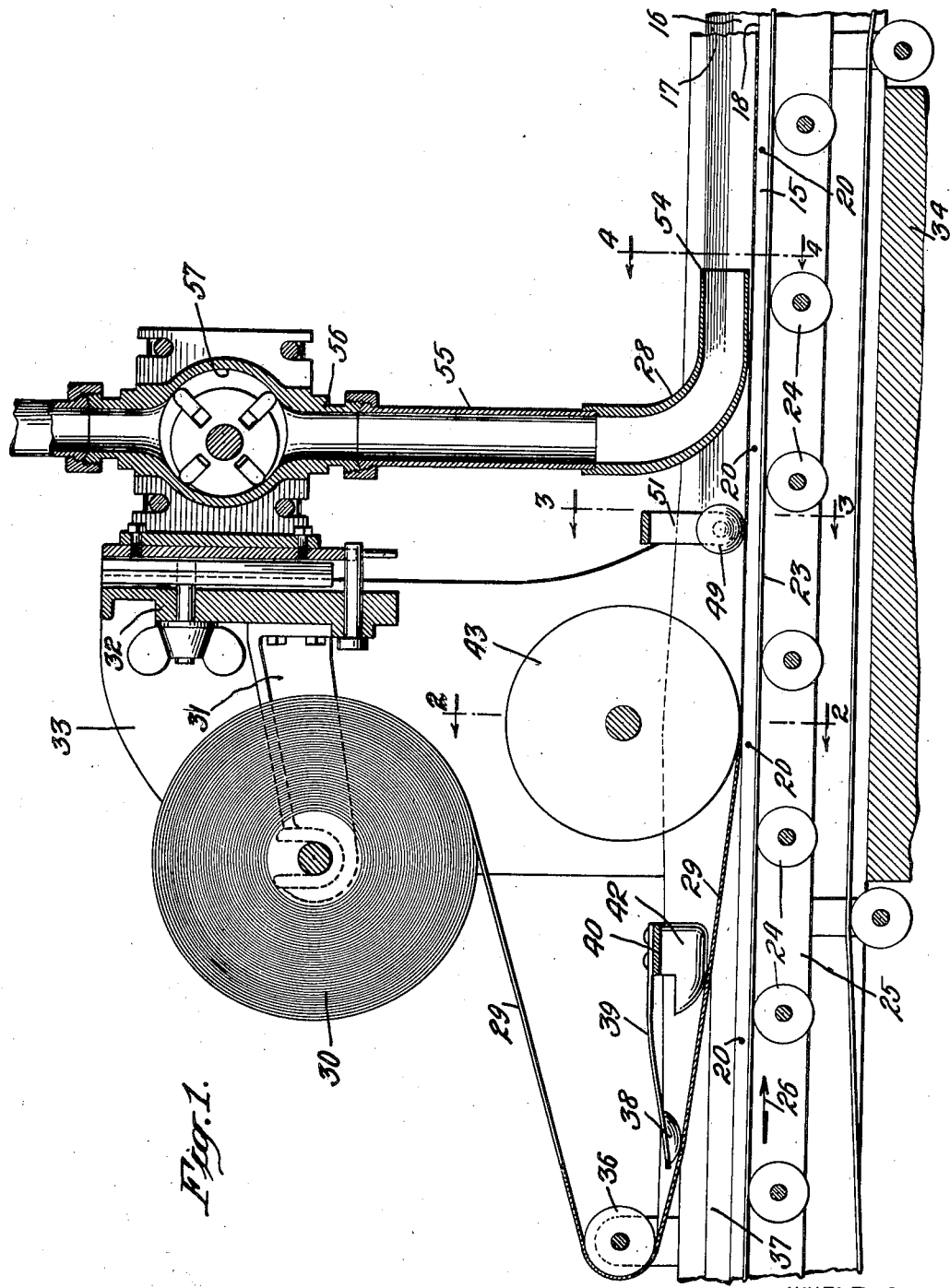

Jan. 14, 1936.  L. A. MAPES  2,027,545
APPARATUS FOR FORMING AND WRAPPING BRICKS OF ICE CREAM AND THE LIKE
Filed Aug. 7, 1934  3 Sheets-Sheet 1

INVENTOR
LESLIE A. MAPES
BY
English and Studwell
ATTORNEYS

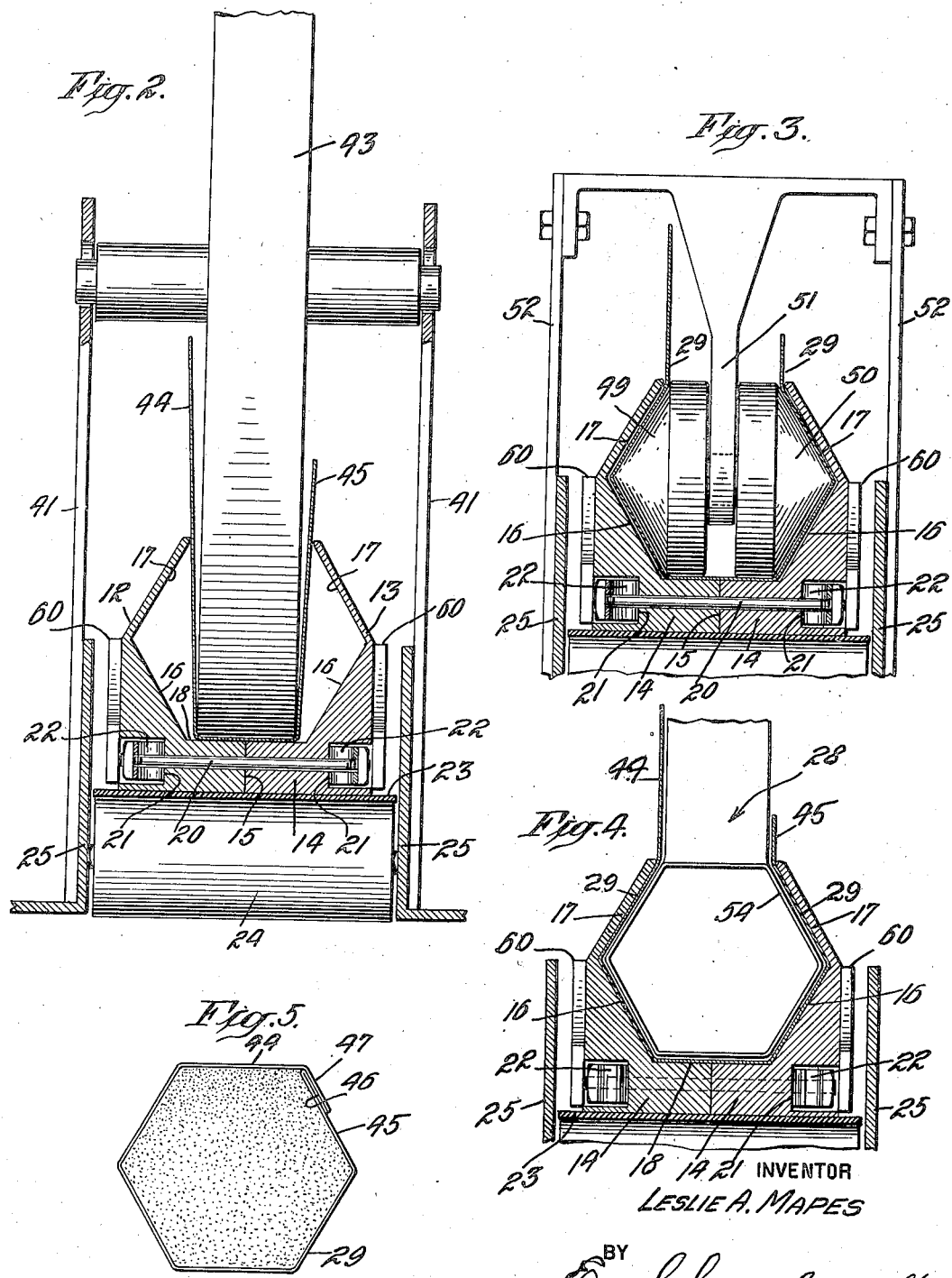

Jan. 14, 1936. L. A. MAPES 2,027,545
APPARATUS FOR FORMING AND WRAPPING BRICKS OF ICE CREAM AND THE LIKE
Filed Aug. 7, 1934 3 Sheets-Sheet 3
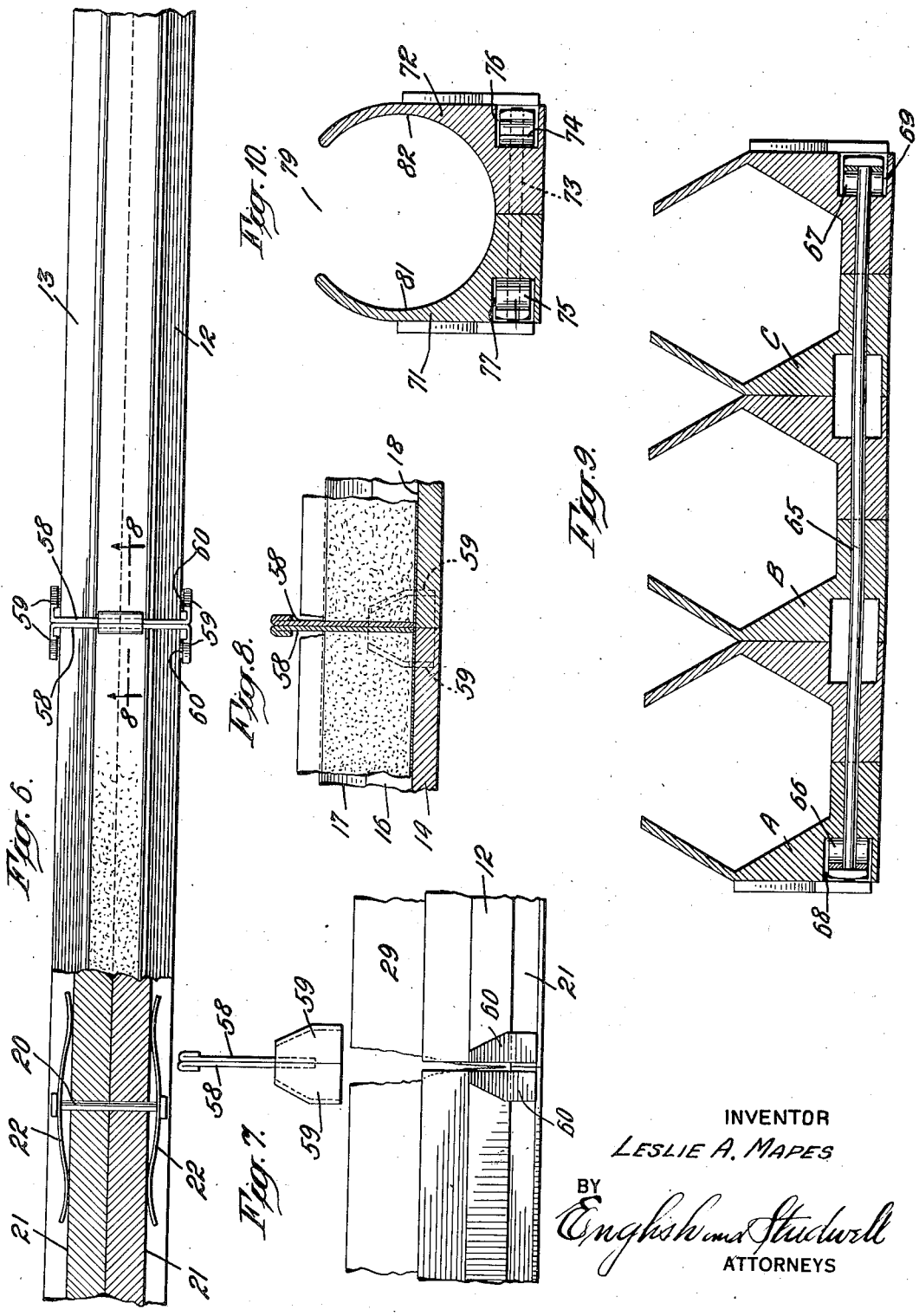
INVENTOR
LESLIE A. MAPES
BY
English and Studwell
ATTORNEYS Patented Jan. 14, 1936

2,027,545

UNITED STATES PATENT OFFICE 2,027,545

APPARATUS FOR FORMING AND WRAPPING BRICKS OF ICE CREAM AND THE LIKE

Leslie A. Mapes, Palisades, N. J., assignor to The Borden Company, New York, N. Y., a corporation of New Jersey Application August 7, 1934, Serial No. 738,827

8 Claims. (Cl. 93—2)

The present invention relates to an improvement in apparatus for forming and wrapping bricks of plastic materials, such as ice cream, and is more particularly an improvement in the method and apparatus disclosed and claimed in my Patent No. 1,986,589, dated January 1, 1935. The ice cream bricks produced by the apparatus of said patent are square or rectangular in cross section. It has been found desirable for some purpose to produce an ice cream brick polygonal and also substantially round in cross section. The object of the present invention is to provide improved devices for producing such ice cream bricks.

In the accompanying drawings illustrating the preferred form of the invention, Fig. 1 is a vertical, longitudinal section of so much of the apparatus of said patent as is necessary to illustrate the application of the improved devices of the present invention thereto; Figs. 2, 3, and 4 are cross sections taken on the lines 2—2, 3—3, and 4—4, respectively, of Fig. 1; Fig. 5 is an end elevation of a wrapped brick of ice cream polygonal in cross section produced by the apparatus of the invention; Fig. 6 is a top plan, partly in section, of the abutting ends of two improved trays of the invention; Fig. 7 is a side elevation at the abutment point of two trays, with the tray end closure plates removed; Fig. 8 is a section taken on the line 8—8 of Fig. 6; Fig. 9 is a cross section of a tray which produces a brick substantially round in cross section; and Fig. 10 is a cross section of a plurality of trays of polygonal cross section arranged as a gang so as to produce simultaneously a plurality of bricks of ice cream of the same or various flavors.

The improved ice cream brick forming devices of the invention comprise a split or two-part tray or channel member, with its associated parts whereby there is produced on suitable apparatus, as for example, the apparatus of said patent, continuous strips of ice cream of the requisite cross section which may be hardened and then cut into bricks of the desired length. In the form of the invention shown in Figs. 1 to 6 the tray or channel member comprises the two parts 12 and 13 adapted to form between them a strip of ice cream of hexagonal cross section. The two parts 12 and 13 of the split tray are alike in shape and size and comprise the base portions 14, abutting each other at the point 15, and upstanding sides. The sides of the tray members 12 and 13 slope outwardly at the points 16 and then at their upper ends 17 come toward each other, whereby there is formed a mold consisting of five surfaces of equal length and breadth. The upper ends 17 of the tray members are separated a distance equal to the length of the top surface 18 of the equal to the length of the top surface 18 of the base portions 14 of the tray members, so that when the strip of ice cream is taken from the tray members it is of hexagonal cross section. The tray members are yieldingly held together by means of rods 20 the outer ends of which pass through curved leaf springs 22 which press against the recessed sides 21 of the base section 14 of the tray members. The two sections of the tray or channel member are thus held resiliently together during the formation of the brick of ice cream in order that when the brick has been hardened the tray members may be separated and the frozen cream removed therefrom longitudinally.

While the ice cream is being fed into the tray or channel member, the latter is adapted to rest on and be carried forward by an endless conveyor 23 supported on the rolls 24 mounted in the brackets 25 rising from the base 34 of the apparatus. The conveyor travels in the direction of the arrow marked 26 in Fig. 1. As described in said patent the tray is fed into the apparatus at the left hand thereof and pushed under the nozzle 28, and against the rear end of the preceding tray which has just been filled.

The ice cream is not fed directly into the tray, but into a paper lining which serves as a wrapper for the ice cream after it has been hardened and removed from the tray. The wrapper paper 29 is supplied in a roll 30 supported in brackets 31 from a cross piece 32 connecting the uprights 33 rising from the base 34 of the apparatus. The wrapper paper passes over an idler roll 36 into the tray, indicated at 37 in Fig. 1, resting on the conveyor 23, and passes first under a preliminary former 38 in the shape of a rounded button supported on a leaf spring 39 mounted on a bracket 40 supported from the brackets 25. The paper then passes under a secondary rounded former 42 also supported from the bracket 40. The formers 38 and 42 serve to press the wrapper paper into a U-shaped channel with widely diverging sides. The wrapper paper then passes under a roll 43 with flat periphery and sides supported from the brackets 41 and so located that its lower edge is separated from the bottom 18 of the tray pieces slightly more than the thickness of the wrapper paper.

The roll 43 serves to form the paper into U-shape with a flat bottom and vertically upstanding sides, as shown in Fig. 2. In this figure it will be noted that the left hand side 44 of the U or channel shaped wrapper is higher than the right hand side 45. The excess paper on the left hand side 44 is utilized, when the ice cream has been fed into the paper lined tray to be folded down over the side 45, as shown in Fig. 5, thereby completely enclosing the sides of the ice cream brick. It will be noted in this figure that the overlapping end 46 of the side 45 is turned outwardly upon itself and that the end 47 of the side 44 is turned down upon the end 46 of the side 45. It will be understood of course that the end 46 of the side 45 can be folded down under the side 44, but it is preferred to fold the ends of the sides 44 and 45 upon each other in the manner shown in Fig. 5.

When the wrapper paper has passed the wheel 43 it meets the former rolls 49 and 50, which serve to press the sides of the U-shaped wrapper against the inner sides of the tray or channel members 12 and 13, as shown in Fig. 3. For this purpose the outer sides of the rolls 49 and 50 have the same contour as the inner surfaces 16 and 17 of the parts 12 and 13. The roll members 49 and 50 are independently mounted and turn on a horizontal axis supported in the bearing member 51 mounted in the uprights 52 rising from the base 34 of the apparatus. As the wrapper paper travels along with the trays or channel sections, the roller members 49 and 50 rotate and so serve to press the sides of the wrapper paper into pentagonal form, as shown in Figs. 3 and 4, with the upper ends 47 and 46 of the sides 44 and 45 projecting upwardly beyond the upper ends of the tray sections 12 and 13.

The roll members 49 and 50 are located just forward of the nozzle 28 so that when the wrapper paper has been put into requisite cross section it is in condition to receive the plastic ice cream extruded through the discharge end 54 of the nozzle 28. It will be noted by reference to Fig. 4 that this discharge end 54 of the nozzle 28 has the same hexagonal shape as the finished brick of ice cream shown in Fig. 5. The nozzle 28 is mounted on the lower end of a vertical pipe 55 attached to the discharge end 56 of a conventional-type pressure pump 57 the casing of which is supported from the cross piece 32, all as explained in said patent.

The trays are fed continuously beneath the nozzle 28, each succeeding tray being pushed up against the rear end of the preceding tray, so that the strip of ice cream extruded from the nozzle 28 is continuous. The trays are of convenient length, about 10 or 12 feet, and as a tray is filled the wrapper extending from it to the next tray is cut, and a closure member 58 is placed over each abutting end of the trays, as indicated in Figs. 6, 7, and 8. Each closure member 58 is an upright piece of the width of the tray members 12 and 13 and is provided with two right angled arms 59 adapted to fit over cleat pieces 60 located at the lower outer ends of each tray section. Accordingly when the tray of ice cream is removed form the filling apparatus it is enclosed at its bottom and its four sides leaving the upper side uncovered. This side is then covered by folding down the end 46 of the wrapper side 45 upon itself and folding down the side 44 of the wrapper upon the top of the ice cream and overlapping the end 47 of the side 44 upon the wrapper end 46. The tray of ice cream which is still in plastic condition is then placed in the hardening room. When it is removed from the hardening room the closure pieces 58 are first removed, the tray sections are then spread apart, the leaf springs 22 yielding readily for this purpose, and the strip of ice cream is readily ejected from the tray.

In the modified form of the invention shown in Fig. 9 there is illustrated a plurality or gang of improved trays or channels, and which are indicated at A, B, and C. These trays or channels are exactly the same in construction as the tray or channel shown in Figs. 1 to 6. They are yieldingly held together in operative condition by means of the elongated rod 65 which passes through the curved springs 66 and 67 received in the recesses 68 and 69 of the two outer trays A and C. These trays, A, B, and C, are adapted for use with a plurality of nozzles, as shown in said patent, to receive multi-flavored strips of ice cream, or they can be used with a plurality of nozzles discharging a plurality of strips of ice cream all of one color in order to increase production. When the strips of ice cream in them have been hardened in the hardening room and the trays are removed therefrom, the hardened strips of ice cream are readily removed from the trays by pulling the two outer trays A and C away from each other, thereby loosening the hold of the trays upon the frozen strips of ice cream.

The modified form of tray or channel shown in Fig. 10 is adapted to produce a strip of ice cream substantially round in cross section and comprises the two sections 71 and 72 yieldingly held together by the rod 73 which passes through the springs 74 and 75 of the same construction and mode of operation as the springs 22. The springs 74 and 75 are received in the recesses 76 and 77 in the bases of the tray sections 71 and 72. It will be understood, of course, that since a roll corresponding to the roll 43 must enter the open upper end 79 of the tray shown in Fig. 10 and that rolls corresponding to the rolls 49 and 50 press the paper against the inner surfaces 81 and 82 of this tray, the upper surface of the roll will not be accurately arcuate. However, for all practical purposes the strip of ice cream produced in this form of tray is substantially circular in cross section.

I claim:—

1. In an apparatus for forming ice cream bricks, a conveyor, an elongated channel-shaped tray adapted to be carried thereon, said tray being of such shape in cross section that the lower and upper ends of the sides thereof are nearer together than the middle portions thereof, said tray being split longitudinally, means for holding the tray parts yieldingly together, means for forming a paper strip into channel shape and forcing it into the tray, means for causing the sides of the channel-shaped paper strip to conform with the inner surfaces of the tray, and means for forcing ice cream into the paper-lined tray.

2. In an apparatus for forming ice cream bricks, a conveyor, an elongated channel-shaped tray adapted to be carried thereon, said tray being of hexagonal shape in cross section, the bottom of the tray being flat and the upper ends of the two sides of the tray being separated a distance substantially equal to the width of the bottom of the tray, said tray being split longitudinally, means for yieldingly holding the two parts of the tray together, means for forming a paper strip in channel shape and forcing it into the tray, a device for causing the sides of the channel-shaped paper strip to conform with the inner surfaces of the tray, said device consisting of two cone-shaped pieces constructed and arranged to conform with the bottom and sides of the tray and mounted to turn independently of each other on a horizontal axis, and means for forcing ice cream into the paper-lined tray.

3. In an apparatus for forming ice cream bricks, a conveyor, an elongated channel-shaped tray adapted to be carried thereon, said tray being split longitudinally into two sections and each section being channel-shaped in cross section, means for yieldingly holding two sections of the tray together, means for folding a strip of paper into U-shape and forcing it into the tray, a rotatable device for each section of the tray constructed and arranged to force one of the upstanding legs of the U-shaped wrapper against the inner surfaces of the adjacent section of the tray, and means for forcing ice cream into the paper-lined tray.

4. In an apparatus for forming ice cream bricks, an elongated channel-shaped tray, means for moving said tray endwise, said tray being split longitudinally into two sections and each section being channel-shaped in cross section, means for separably holding the two sections of the tray together, means for folding a strip of paper into U-shape and forcing it into the tray, a rotatable device for each section of the tray constructed and arranged to force one of the upstanding legs of the U-shaped wrapper against the inner surfaces of the adjacent section of the tray, and means for forcing ice cream into the paper-lined tray.

5. In an apparatus for forming ice cream bricks, an elongated channel-shaped tray, means for moving the tray endwise, said tray being of such shape in cross section that the upper ends of the sides thereof are nearer together than the middle portions thereof, said tray being split longitudinally, means for holding the tray parts separably together, means for forming a paper strip into channel-shape and forcing it into the tray, means for causing the sides of the channel-shaped strip to conform with the inner surfaces of the tray, and means for forcing ice cream into the paper-lined tray.

6. In an apparatus for forming ice cream bricks, an elongated channel-shaped tray, means for carrying the tray forward, said tray being composed of two sections one of which is adapted to move laterally outward relatively to the other section, and each section being channel-shaped in cross section, means for separably holding one section of the tray toward the other section, means for lining the inner surfaces of the tray with a strip of paper, and means for forcing ice cream into the paper-lined tray.

7. In an apparatus for forming ice cream bricks, an elongated channel-shaped tray, means for moving the tray endwise, said tray being composed of a plurality of longitudinally extending parts separably held together transversely, means for pressing a paper lining against the inner surfaces of the channel-shaped tray as it moves endwise, and means for forcing ice cream into the paper-lined tray.

8. An apparatus for forming ice cream bricks, including an elongated channel-shaped tray, said tray having the upper portions of its side walls nearer together than the middle portions thereof, and said tray having said side walls relatively movable toward and from each other, means for advancing said tray endwise, means for progressively forming a paper lining within said tray and conforming to the shape of the tray, and means for delivering ice cream into the paper-lined tray as the latter advances endwise.

LESLIE A. MAPES.